United States Patent
Nakaso et al.

(10) Patent No.: US 9,246,784 B2
(45) Date of Patent: Jan. 26, 2016

(54) INFORMATION NOTIFICATION APPARATUS, INFORMATION NOTIFICATION SYSTEM, INFORMATION NOTIFICATION METHOD, AND PROGRAM

(75) Inventors: Mariko Nakaso, Shiga (JP); Fumiaki Suzuki, Osaka (JP); Masaru Yamaoka, Osaka (JP); Shuya Hosokawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 367 days.

(21) Appl. No.: 13/818,700

(22) PCT Filed: Apr. 25, 2012

(86) PCT No.: PCT/JP2012/002825
§ 371 (c)(1),
(2), (4) Date: Feb. 25, 2013

(87) PCT Pub. No.: WO2013/001701
PCT Pub. Date: Jan. 3, 2013

(65) Prior Publication Data
US 2013/0151703 A1    Jun. 13, 2013

(30) Foreign Application Priority Data

Jun. 27, 2011    (JP) .................................. 2011-141396

(51) Int. Cl.
| | | |
|---|---|---|
| G06F 15/177 | (2006.01) | |
| G06F 15/173 | (2006.01) | |
| G06F 15/16 | (2006.01) | |
| G06F 3/00 | (2006.01) | |

(Continued)

(52) U.S. Cl.
CPC .................. *H04L 43/10* (2013.01); *H04Q 9/00* (2013.01); *H04Q 2209/823* (2013.01)

(58) Field of Classification Search
CPC .... G05B 15/02; G05B 13/042; G05B 19/042; G05B 19/402; G05B 2219/31286; G06F 3/0482; G06F 17/30554; G06F 17/3087; G06F 3/04842; G06F 13/00; G06F 1/3262; G06F 1/3265; G06F 3/0416
See application file for complete search history.

(56) References Cited

U.S. PATENT DOCUMENTS

| | | | | |
|---|---|---|---|---|
| 2007/0112939 A1* | 5/2007 | Wilson et al. | ................. | 709/219 |
| 2009/0300164 A1* | 12/2009 | Boggs et al. | ................. | 709/224 |

(Continued)

FOREIGN PATENT DOCUMENTS

| | | |
|---|---|---|
| JP | 2000-209675 | 7/2000 |
| JP | 2001-285961 | 10/2001 |

(Continued)

OTHER PUBLICATIONS

International Search Report issued Jun. 19, 2012 in International (PCT) Application No. PCT/JP2012/002825.

*Primary Examiner* — Djenane Bayard
*Assistant Examiner* — Farrukh Hussain
(74) *Attorney, Agent, or Firm* — Wenderoth, Lind & Ponack, L.L.P.

(57) ABSTRACT

An information notification apparatus includes a first reception unit that receives a first state change notification indicating that the operating state of an electrical appliance has changed to a first state, a transmission unit that transmits a state notification indicating that the operating state of the electrical appliance is the first state to an information terminal, and a second reception unit that receives an acknowledgement notification. The first reception unit further receives a second state change notification indicating that the electrical appliance has been changed to a second state from the electrical apparatus. The transmission unit calculates a correlation value for each of information terminals and transmits the state notification to an information terminal having a calculated correlation value higher than a threshold value, the correlation value indicating a degree of likelihood that the owner of the information terminal has performed an operation corresponding to the second operating state.

10 Claims, 14 Drawing Sheets

(51) Int. Cl.
*H04M 1/725* (2006.01)
*H04L 12/26* (2006.01)
*H04Q 9/00* (2006.01)

(56) References Cited

U.S. PATENT DOCUMENTS

2010/0071777 A1* 3/2010 Smith et al. .................... 137/14
2010/0161082 A1* 6/2010 Ebrom et al. ................... 700/17
2012/0016532 A1* 1/2012 Spicer et al. .................. 700/296

FOREIGN PATENT DOCUMENTS

| JP | 2001-344183 | 12/2001 |
| JP | 2007-213152 | 8/2007 |
| JP | 2009-027523 | 2/2009 |

\* cited by examiner

FIG. 4

Father's smartphone
2011. 3. 3   As of 21:00
Last operation 2011. 3. 3   20:35

| Electrical appliance | Notification time | Acknowledgment notification | State notification acknowledgment time | Terminal operation time | State change time | Correlation value |
|---|---|---|---|---|---|---|
| Washing machine | 2011.3.1 9:14 | Yes | 2011.3.1 12:16 | — | 2011.3.1 9:17 | 0 |
| | 2011.3.2 9:11 | Yes | 2011.3.2 12:14 | — | 2011.3.2 9:13 | 0 |
| | 2011.3.3 9:16 | Yes | 2011.3.3 12:15 | — | 2011.3.3 9:16 | 0 |
| Air conditioner in living room | 2011.3.1 20:00 | Yes | 2011.3.1 21:12 | — | — | -2 |
| | 2011.3.2 20:00 | Yes | 2011.3.2 20:05 | — | — | -2 |
| | 2011.3.3 20:00 | Yes | 2011.3.3 22:11 | — | — | -2 |
| Recorder | 2010.9.23 22:00 | Yes | 2010.9.23 22:51 | — | 2010.9.27 10:45 | 1 |
| | 2010.12.27 22:00 | Yes | 2010.12.27 22:07 | — | 2010.12.27 23:15 | 2 |
| | 2011.2.28 22:00 | Yes | 2011.2.28 22:15 | — | — | -2 |

FIG. 5

Mother's smartphone
2011. 3. 3   As of 21:00
Last operation  2011. 3. 3   18:23

| Electrical appliance | Notification time | Acknowledgment notification | State notification acknowledgment time | Terminal operation time | State change time | Correlation value |
|---|---|---|---|---|---|---|
| Washing machine | 2011.3.1 9:14 | Yes | 2011.3.1 9:15 | — | 2011.3.1 9:17 | 2 |
| | 2011.3.2 9:11 | Yes | 2011.3.2 9:12 | — | 2011.3.2 9:13 | 2 |
| | 2011.3.3 9:16 | No | — | 2011.3.3 10:34 | 2011.3.3 9:16 | 0 |
| Air conditioner in living room | 2011.3.1 20:00 | Yes | 2011.3.1 21:15 | — | — | -2 |
| | 2011.3.2 20:00 | Yes | 2011.3.2 21:55 | — | — | -2 |
| | 2011.3.3 20:00 | No | — | — | — | -2 |
| Recorder | 2010.9.23 22:00 | Yes | 2010.9.24 7:59 | — | 2010.9.27 10:45 | 1 |
| | 2010.12.27 22:00 | Yes | 2010.12.27 22:01 | — | 2010.12.27 23:15 | 2 |
| | 2011.2.28 22:00 | Yes | 2011.3.1 9:15 | — | — | -2 |

FIG. 6A

Washing machine: Correlation value history for notification that "the laundry is done"
2011. 3. 4  As of 21:00

| Information terminal | Notification time ||||| Average correlation value |
| --- | --- | --- | --- | --- | --- | --- |
| | 2011.3.1 9:14 | 2011.3.2 9:11 | 2011.3.3 9:16 | 2011.3.4 9:14 | | |
| Father's smartphone | 0 | 0 | 0 | 0 | | 0 |
| Mother's smartphone | 2 | 2 | 0 | 2 | | 1.5 |
| Child's mobile phone | 0 | 0 | 0 | 0 | | 0 |
| Television in living room | 0 | 0 | 2 | 0 | | 0.5 |

FIG. 6B

Air conditioner in living room: Correlation value history for notification about "set temperature"
2011. 3. 4  As of 21:00

| Information terminal | Notification time | | | | Average correlation value |
|---|---|---|---|---|---|
| | 2011.3.1 9:14 | 2011.3.1 9:14 | 2011.3.1 9:14 | 2011.3.1 9:14 | |
| Father's smartphone | -2 | -2 | -2 | -2 | -2 |
| Mother's smartphone | -2 | -2 | -2 | -2 | -2 |
| Child's mobile phone | -2 | -2 | -2 | -2 | -2 |
| Television in living room | -2 | -2 | -2 | -2 | -2 |

FIG. 9

Father's smartphone
2011. 3. 3   As of 21:00
Last operation  2011. 3. 3   20:35

| Electrical appliance | Notification time | Acknowledgment notification | State notification acknowledgment time | State change time | Position at state change time | Correlation value |
|---|---|---|---|---|---|---|
| Washing machine | 2011.3.1 9:14 | Yes | 2011.3.1 12:16 | 2011.3.1 9:17 | Outside home | -3 |
|  | 2011.3.2 9:11 | Yes | 2011.3.2 12:14 | 2011.3.2 9:13 | Outside home | -3 |
|  | 2011.3.3 9:16 | Yes | 2011.3.3 12:15 | 2011.3.3 9:16 | Outside home | -3 |
| Air conditioner in living room | 2011.3.1 20:00 | Yes | 2011.3.1 21:12 | — | Outside home | -3 |
|  | 2011.3.2 20:00 | Yes | 2011.3.2 20:05 | — | Outside home | -3 |
|  | 2011.3.3 20:00 | Yes | 2011.3.3 22:11 | — | Outside home | -3 |
| Recorder | 2010.9.23 22:00 | Yes | 2010.9.23 22:51 | 2010.9.27 10:45 | At home | 2 |
|  | 2010.12.27 22:00 | Yes | 2010.12.27 22:07 | 2010.12.27 23:15 | At home | 3 |
|  | 2011.2.28 22:00 | Yes | 2011.2.28 22:15 | — | At home | -3 |

FIG. 10

Washing machine: Correlation value history for notification that "the laundry is done"
2011. 3. 4   As of 21:00

| Information terminal | Notification time | | | | | Average correlation value |
|---|---|---|---|---|---|---|
| | 2011.3.1  9:14 | 2011.3.2  9:11 | 2011.3.3  9:16 | 2011.3.3  9:14 | 2011.3.1  9:14 | |
| Father's smartphone | -3 | -3 | -3 | -3 | -3 | -3 |
| Mother's smartphone | 3 | 3 | 0 | 3 | 3 | 2.25 |
| Child's mobile phone | -3 | -3 | -3 | 3 | 3 | -1.5 |
| Television in living room | 0 | 0 | 3 | 0 | 0 | 0.75 |

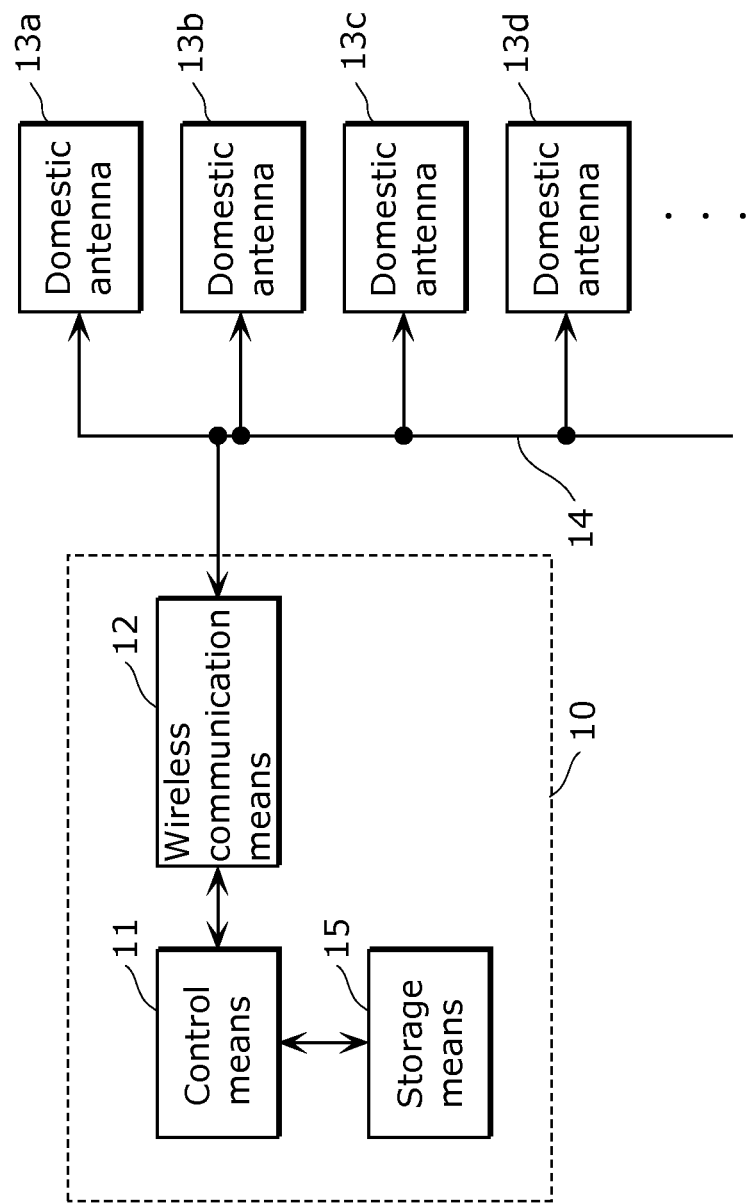

FIG. 13

| Registration No. | Information source | Code | Notification method | Notification-destination specification | | | |
|---|---|---|---|---|---|---|---|
| | | | | 1st | 2nd | 3rd | ... |
| 1 | Air conditioner in bed room on second floor | 23a | Sequential | Mother 30b | Father 30a | Child 30c | ... |
| 2 | Fan in study on second floor | 23b | Sequential | Father 30a | Mother 30b | Child 30c | ... |
| 3 | TV in children's room on second floor | 23c | All | Child 30b | Mother 30b | ╳ | ... |
| 4 | TV in living room on first floor | 23d | All | Mother 30c | Child 30c | Father 30a | ... |
| 5 | Air conditioner in living room on first floor | 23e | All | Mother 30b | Child 30c | Father 30a | ... |
| 6 | Washing machine in kitchen on first floor | 23f | Single | Mother 30b | ╳ | ╳ | ... |
| 7 | Microwave oven in kitchen on first floor | 23g | Sequential | Mother 30b | Child 30c | ... | ... |
| ... | ... | ... | ... | ... | ... | ... | ... | ies can notify mobile terminals held by users of
INFORMATION NOTIFICATION APPARATUS, INFORMATION NOTIFICATION SYSTEM, INFORMATION NOTIFICATION METHOD, AND PROGRAM

TECHNICAL FIELD

The present invention relates to an information notification apparatus for notifying display devices held by users of the operating states of electrical appliances for use at home via a communication network.

BACKGROUND OF INVENTION

If information about electrical appliances needed by users has been set in advance, conventional information notification apparatuses can notify mobile terminals held by users of information about electrical appliances based on the set information. This enables the users to remotely control electrical appliances in accordance with the notified information, using their mobile terminals (see PTL 1, for example). FIGS. 12 and 13 illustrate a conventional information notification apparatus disclosed in PTL 1.

Referring to FIG. 12, an information notification apparatus 10 for managing information is configured by control means 11 for controlling exchanges of information between each information source and each mobile information device, wireless communication means 12 for transmitting and receiving data to and from each information source and each mobile information device using a radio signal, a domestic antenna 13 for use in exchanging data between each information source and each mobile information device, wiring means 14 for connecting the information notification apparatus 10 and the domestic antennas 13, and storage means 15 for storing information transmitted from each information source and each mobile information device.

The information notification apparatus 10 disclosed in PTL 1 checks the codes of mobile information devices to be notified of, using an exemplary notification-destination specification list illustrated in FIG. 13, and transmits notification information. The method of notification can be set in the notification-destination specification list, and examples of the notification methods include simultaneous notification to all users, notification to a single user, and sequential notification to users at a fixed time interval. Then, in order to contact an operator with respect to the notification information, a content to be displayed on the mobile information devices and notification means using a physical phenomenon such as sound, light, or vibrations are selected and again converted into radio signals by the wireless communication means 12, and the radio signals are transmitted to the mobile information devices with the domestic antenna 13.

Accordingly, in the case where a single electrical appliance is shared by a plurality of users such as a case where an electrical appliance is shared by family members, it is possible to notify only a user who needed information of necessary information and to give a notification of effective information on a space-limited display screen.

CITATION LIST

Patent Literature

[PTL 1] Japanese Unexamined Patent Application Publication No. 2000-209675

SUMMARY OF INVENTION

However, with the above-described conventional information notification apparatus 10, there is a problem that it is difficult to change the range of notification of information in accordance with, for example, a change in the lifestyle of the user.

The present invention has been conceived in order to solve the aforementioned conventional problem, and it is an object of the present invention to provide an information notification apparatus capable of transmitting information about the operating states of electrical appliances to a user terminal that is estimated to require that information at the current point in time.

An information notification apparatus according to an aspect of the present invention notifies at least one of a plurality of information terminals of operation information about an electrical appliance. Specifically, the information notification apparatus includes a storage unit, a first reception unit configured to receive a first state change notification from the electrical appliance, the first state change notification indicating that an operating state of the electrical appliance has changed to a first state, a transmission unit configured to, in response to the first reception unit having received the first state change notification, transmit a state notification to at least one of the information terminals, the state notification indicating that the operating state of the electrical appliance is the first state, and a second reception unit configured to receive an acknowledgement notification indicating that the state notification has been acknowledged from the at least one of the information terminals to which the state notification has been transmitted, and store the received acknowledgement notification into the storage unit The first reception unit is further configured to receive a second state change notification from the electrical appliance and store the received second state change notification into the storage unit, the second state change notification indicating that the operating state of the electrical appliance has changed to a second state through an operation performed on the electrical appliance after the transmission of the state notification, and the transmission unit is configured to calculate a correlation value for each of the information terminals based on the acknowledgement notification and the second state change notification that are previously stored in the storage unit, and transmit the state notification to an information terminal that has a calculated correlation value higher than a threshold value among the information terminals, the correlation value indicating a degree of likelihood that an owner of the information terminal has performed an operation corresponding to the second operating state.

These general and specific aspects may be implemented using a system, a method, an integrated circuit, a computer program, or a recording medium, or may be implemented by any combination of a system, a method, an integrated circuit, a computer program, and a recording medium.

As described above, according to the present invention, even if the range of notification of a state notification is not set by a user, it is possible to determine an optimal range of notification for each state notification, based on correlation values calculated using acknowledgement notifications and second state change notifications that have been previously received.

BRIEF DESCRIPTION OF DRAWINGS

FIG. 4 shows an example of a state history of an information terminal according to Embodiment 1.

FIG. 5 shows an example of the state history of another information terminal according to Embodiment 1.

FIG. 6A shows an example of correlation values for information terminals with respect to a state notification of a washing machine, and average correlation values that are average values of correlation values calculated within a predetermined period of time, according to Embodiment 1.

FIG. 6B shows an example of correlation values for information terminals with respect to a state notification of an air conditioner in the living room, and average correlation values that are average values of correlation values calculated within a predetermined period of time, according to Embodiment 1.

FIG. 9 shows an example of the state history of an information terminal according to Embodiment 2.

FIG. 10 shows an example of correlation values for information terminals with respect to a state notification of a washing machine, and average correlation values that are average values of correlation values calculated within a predetermined period of time, according to Embodiment 2.

FIG. 12 illustrates a conventional information notification apparatus.

FIG. 13 illustrates an exemplary notification-destination specification list used in the conventional information notification apparatus.

DETAILED DESCRIPTION OF INVENTION

Figure 1:
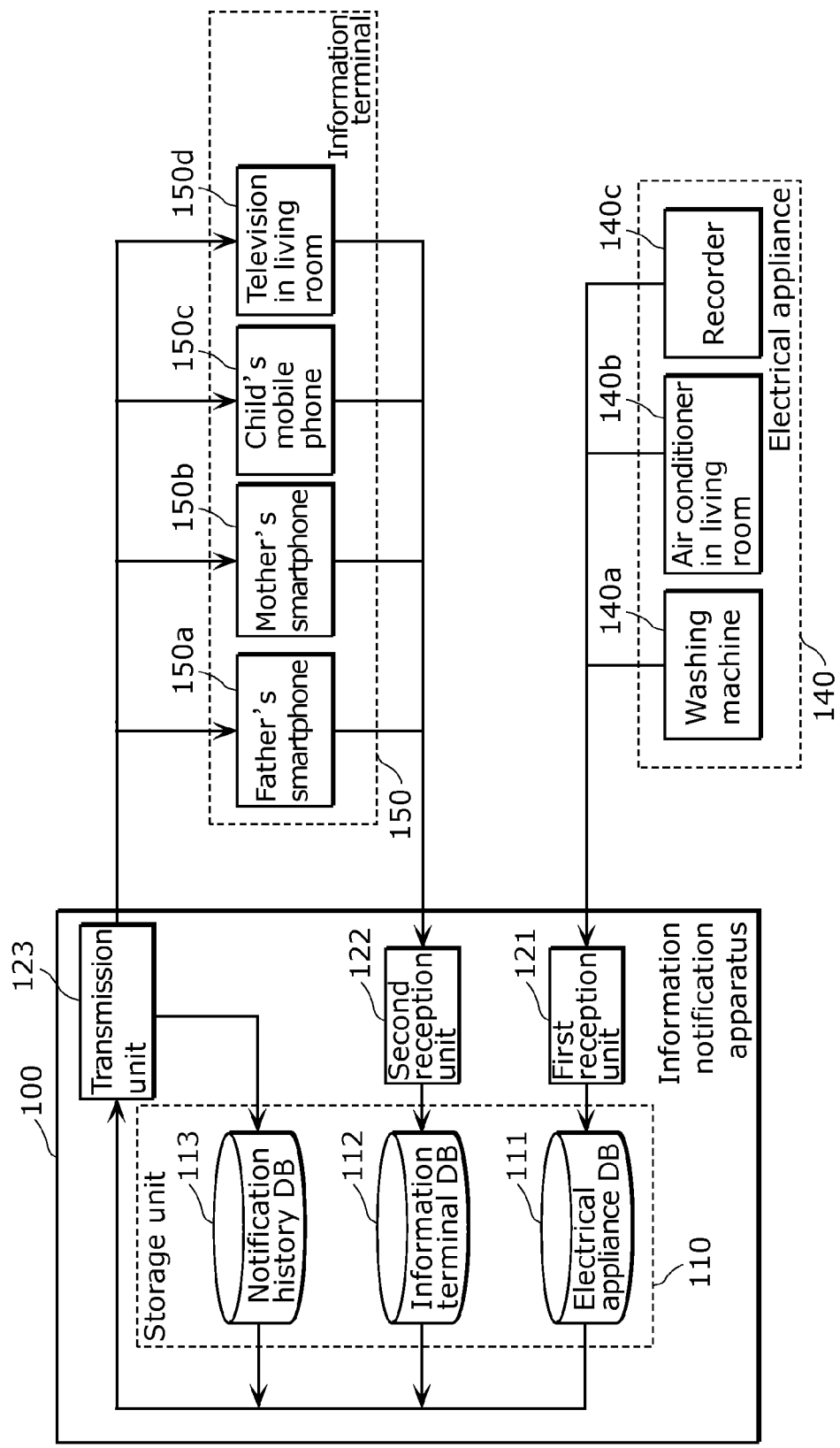
FIG. 1 is a configuration diagram illustrating a basic configuration of an information notification apparatus according to Embodiment 1.

Underlying Knowledge Forming Basis of the Present Invention

With the above-described conventional configuration disclosed in PTL 1, it is necessary for a user to set the range of notification in advance, meaning that time and effort is necessary for the settings. In addition, in the case where information needed by each user changes with a change in the lifestyle of the user, the settings have to be changed whenever a change occurs from the state where the range of notification has been once set.

In the case of controlling an electrical appliance using a mobile information device as an occasion arises as in the conventional configuration, it is possible to specify mobile information devices that have transmitted a control signal and to specify a mobile information device to which information is to be transmitted, based on the frequencies of use of the mobile information devices. However, in the case of an electrical appliance particularly such as a washing machine or a refrigerator that requires users who operate the appliance to directly come to the place where the electrical appliance is located, the user do not always perform remote control using their mobile information devices. In that case, there is a problem in that it is uncertain which user often uses a certain electrical appliance, i.e., which user requires information about that electrical appliance.

In order to solve such a problem, an information notification apparatus according to an aspect of the present invention notifies at least one of a plurality of information terminals of operation information about an electrical appliance. Specifically, the information notification apparatus includes a storage unit, a first reception unit configured to receive a first state change notification from the electrical appliance, the first state change notification indicating that an operating state of the electrical appliance has changed to a first state, a transmission unit configured to, in response to the first reception unit having received the first state change notification, transmit a state notification to at least one of the information terminals, the state notification indicating that the operating state of the electrical appliance is the first state, and a second reception unit configured to receive an acknowledgement notification indicating that the state notification has been acknowledged from the at least one of the information terminals to which the state notification has been transmitted, and store the received acknowledgement notification into the storage unit. The first reception unit is further configured to receive a second state change notification from the electrical appliance and store the received second state change notification into the storage unit, the second state change notification indicating that the operating state of the electrical appliance has changed to a second state through an operation performed on the electrical appliance after the transmission of the state notification, and the transmission unit is configured to calculate a correlation value for each of the information terminals based on the acknowledgement notification and the second state change notification that are previously stored in the storage unit, and transmit the state notification to an information terminal that has a calculated correlation value higher than a threshold value among the information terminals, the correlation value indicating a degree of likelihood that an owner of the information terminal has performed an operation corresponding to the second operating state.

With this configuration, even if the range of state notification is not set by a user, it is possible to determine an optimal range of notification for each state notification, based on correlation values calculated using acknowledgement notifications and second state change notification that have been previously received.

Note that the language "storing an acknowledgement notification in the storage unit" includes the meaning of not only storing part or all of the information included in the acknowledgement notification in the storage unit, but also storing the fact that the acknowledgement notification has been received in the storage unit. The same applies to the language "storing a state change notification in the storage unit."

As an example, the acknowledgement notification may include a state notification acknowledgement time that indicates a time of acknowledgement of the corresponding state notification. The second state change notification may include a state change time that indicates a time of change in the state of the electrical appliance into the second state. The transmission unit may be configured to calculate a higher correlation value as a difference between the state notification acknowledgement time and the state change time is smaller.

Furthermore, the second reception unit may be further configured to receive positional information from each of the information terminals, the positional information indicating a position of the information terminal at the state change time. The transmission unit may be configured to calculate a higher correlation value as a distance between the information terminal and the electrical appliance at the state change time is smaller.

As in the above configuration, by checking the positions of the information terminals at the state change time of an electrical appliance, it is possible to easily specify a user who has operated the electrical appliance and to find a remarkable correlation between the acknowledgement notification from each information terminal and the operation of the electrical appliance.

The transmission unit may be configured to transmit the state notification to an information terminal that has a highest correlation value among the information terminals, and may be configured to, when the acknowledgement notification is not received by the second reception unit after an elapse of a predetermined period of time since the transmission of the state notification, transmit the state notification to an information terminal that has a second highest correlation value among the information terminals.

It is however noted that the method for determining the destination of transmission of a state notification is not limited to the method described above, and a configuration is also possible in which the state notification is transmitted to, among the information terminals, all of information terminals having calculated correlation values higher than a predetermined threshold value.

The transmission unit may be further configured to, in response to the first reception unit having received the second state change notification, transmit an operation complete notification to the at least one of the information terminals to which the state notification has been transmitted, the operation complete notification indicating that an operation corresponding to the state notification has been performed on the electrical appliance.

With this configuration, in the case where an electrical appliance is shared by a plurality of users, it is possible for a user to check whether or not the other user has already taken some action on the state notification.

Furthermore, the transmission unit may be configured to transmit the operation complete notification to, among the at least one of the information terminals to which the state notification has been transmitted, only an information terminal from which the second reception unit has already received the acknowledgement notification at a time at which the first reception unit receives the second state change notification.

Moreover, the transmission unit may be further configured to delete the state notification from, among the at least one of the information terminals to which the state notification has been transmitted, an information terminal from which the second reception unit has not received the acknowledgement notification at a time at which the first reception unit receives the second state change notification.

With this configuration, a state notification that has already been responded is deleted from information terminals because it is unnecessary information. As a result, only information that is necessary to be responded from now on remains, bringing about the effect of preventing users from missing more important information and the effect of enabling users to easily find information to be needed by the users.

An information notification system according to an aspect of the present invention includes an electrical appliance, a plurality of information terminals, and an information notification apparatus for notifying at least one of the information terminals of operation information about the electrical appliance. The information notification apparatus includes a storage unit, a first reception unit configured to receive a first state change notification from the electrical appliance, the first state change notification indicating that an operating state of the electrical appliance has changed to a first state, a transmission unit configured to, in response to the first reception unit having received the first state change notification, transmit a state notification to at least one of the information terminals, the state notification indicating that the operating state of the electrical appliance is the first state, and a second reception unit configured to receive an acknowledgement notification indicating that the state notification has been acknowledged from the at least one of the information terminals to which the state notification has been transmitted, and store the received acknowledgement notification into the storage unit. The first reception unit is further configured to receive a second state change notification from the electrical appliance and store the received second state change notification into the storage unit, the second state change notification indicating that the operating state of the electrical appliance has changed to a second state through an operation performed on the electrical appliance after the transmission of the state notification. The transmission unit is configured to calculate a correlation value for each of the information terminals based on the acknowledgement notification and the second state change notification that are previously stored in the storage unit, and transmit the state notification to, among the information terminals, an information terminal that has a calculated correlation value higher than a threshold value, the correlation value indicating a degree of likelihood that an owner of the information terminal has performed an operation corresponding to the second operating state.

An information notification method according to an aspect of the present invention is a method in which an information notification apparatus including a storage unit notifies at least one of a plurality of information terminals of operation information about an electrical appliance. Specifically, the information notification method includes receiving a first state change notification from the electrical appliance, the first state change notification indicating that an operating state of the electrical appliance has changed to a first state, in response to the receipt of the first state change notification, transmitting a state notification to at least one of the information terminals, the state notification indicating that the operating state of the electrical appliance is the first state, receiving an acknowledgement notification indicating that the state notification has been acknowledged from the at least one of the information terminals to which the state notification has been transmitted, and storing the received acknowledgement notification into the storage unit, and receiving a second state change notification from the electrical appliance and storing the received second state change notification into the storage unit, the second state change notification indicating that the operating state of the electrical appliance has changed to a second state through an operation performed on the electrical appliance after the transmission of the state notification. In the transmission, a correlation value is calculated for each of the information terminals based on the acknowledgement notification and the second state change notification that are previously stored in the storage unit, and the state notification is transmitted to, among the information terminals, an information terminal that has a calculated correlation value higher than a threshold value, the correlation value indicating a degree of likelihood that an owner of the information terminal has performed an operation corresponding to the second operating state.

A program according to an aspect of the present invention causes a computer that includes a storage unit to notify at least one of a plurality of information terminals of operation information about an electrical appliance. Specifically, the program causes the computer to execute receiving a first state change notification from the electrical appliance, the first state change notification indicating that an operating state of the electrical appliance has changed to a first state, in response to the receipt of the first state change notification, transmitting a state notification to at least one of the information terminals, the state notification indicating that the operating state of the electrical appliance is the first state, receiving an acknowledgement notification indicating that the state notification has been acknowledged from the at least one of the information terminals to which the state notification has been transmitted, and storing the received acknowledgement notification into the storage unit, and receiving a second state change notification from the electrical appliance and storing the received second state change notification into the storage unit, the second state change notification indicating that the operating state of the electrical appliance has changed to a second state through an operation performed on the electrical appliance after the transmission of the state notification. In the transmission, a correlation value is calculated for each of the information terminals based on the acknowledgement notification and the second state change notification that are previously stored in the storage unit, and the state notification is transmitted to, among the information terminals, an information terminal that has a calculated correlation value higher than a threshold value, the correlation value indicating a degree of likelihood that an owner of the information terminal has performed an operation corresponding to the second operating state.

Hereinafter, embodiments of the present invention will be described with reference to the drawings. Note that exemplary embodiments described below show general or specific examples. The numerical values, shapes, materials, structural elements, the arrangement and connection of the structural elements, steps, the processing order of the steps etc. shown in the following exemplary embodiments are mere examples, and therefore do not limit the scope of the appended claims and their equivalents. Among the structural elements in the following exemplary embodiments, those that are not recited in any one of the independent claims are described as arbitrary structural elements.

Embodiment 1

FIG. 1 is a configuration diagram illustrating a basic configuration of an information notification apparatus according to Embodiment 1 of the present invention.

An information notification apparatus 100 illustrated in FIG. 1 is connected to electrical appliances 140 for use at home via a communication network and is configured to collect information about the operating states of the electrical appliances 140 and transmit the collected information from its transmission unit 23 to information terminals 150 held by users via the communication network. In other words, the information notification apparatus 100, the electrical appliances 140, and the information terminals 150 constitute an information notification system according to Embodiment 1 of the present invention.

The information notification apparatus 100 illustrated in FIG. 1 includes a storage unit 110 that includes an electrical appliance DB 111, an information terminal DB 112, and a notification history DB 113, a first reception unit 121 configured to receive the states of the electrical appliances 140, a second reception unit 122 configured to receive the states of the information terminals 150, and the transmission unit 23 configured to transmit the states of the electrical appliances 140 to the information terminals 150.

The storage unit 110 stores various types of information such as the information received by the first and second reception units 121 and 122 and the information transmitted by the transmission unit 23. A specific configuration of the storage unit 110 is not particularly limited, and it may be configured using any means capable of recording data, such as a dynamic random access memory (DRAM), a synchronous dynamic random access memory (SDRAM), a flash memory, a ferroelectric memory, or a hard disk drive (HDD).

The first reception unit 121 receives information transmitted from the electrical appliances 140 and stores the received information in the electrical appliance DB 111. The second reception unit 122 receives information transmitted from the information terminals 150 and stores the received information in the information terminal DB 112. The transmission unit 23 transmits the information received by the first reception unit 121 to the information terminals 150 and stores the results of transmission in the notification history DB 113.

The information notification apparatus 100 may be provided in a household and used as a dedicated apparatus for that household, or may be provided in a server center outside households and collect information from a plurality of households or notify the households of information.

While the "electrical appliances 140" in FIG. 1 are used as a generic term for a washing machine 140a, an air conditioner 140b in the living room, and a recorder 140c, examples of the electrical appliances may also include other appliances for mainly use at home, such as a refrigerator, a dish washer, a television, a car navigation system, douches and air dryers for attachment to a toilet, a solar cell, a hot-water supply system, and a storage battery.

The electrical appliances 140 have unique appliance IDs. Each of the electrical appliances 140 transmits appliance information including the appliance ID and the operating state of the electrical appliance 140 to the information notification apparatus 100 via the communication network. The information notification apparatus 100 stores the appliance information received by the first reception unit 121 in the electrical appliance DB 111. The appliance information may include, for example, in addition to the operating state of the electrical appliance 140 indicating whether or not the appliance is powered on, operating conditions set by a user such as a set course and set conditions, environment information about the surroundings of or inside the electrical appliance 140, acquired by a temperature sensor or the like, the number of rotations of a motor, and error information when a problem has occurred.

The appliance information may be collected at regular intervals by issuing an instruction to transmit appliance information from the first reception unit 121 to the electrical appliances 140 at a predetermined interval. Alternatively, the electrical appliances 140 may voluntarily transmit their appliance information at a predetermined interval. As another alternative, the appliance information may be transmitted when the operating states of the electrical appliances 140 have changed.

Here, the information transmitted at the time when the operating states of the electrical appliances 140 have changed is particularly defined as a "state change notification." The state change notification includes, for example, the appliance ID of an electrical appliance 140, the operating state of the electrical appliance 140, and a state change time indicating a time when the operating state has changed. Alternatively, instead of including the state change time in the state change notification, a transmission time indicating a time when the state change notification has been transmitted from the electrical appliance 140 or a reception time indicating a time when the information notification apparatus 100 has received the state change notification may be used, instead of the state change time.

The information notification apparatus 100 determines whether or not the state of an electrical appliance 140 stored in the electrical appliance DB 111 matches one of notification conditions. An example of the notification conditions is whether or not the operating state of the electrical appliance 140 is a state that requires a user to make some determination about the electrical appliance 140 or to take some action on the electrical appliance 140. Specific examples of the conditions include "The laundry in the washing machine 140a is done," "The set heating temperature of the air conditioner 140b in the living room is higher than an energy-saving recommended value," "The recorder 140c has little hard disk space for recording," and "Something is wrong with the compressor of the refrigerator." These conditions are set in advance in the information notification apparatus 100 by a provider of an information notification service.

When the operating state of an electrical appliance 140 stored in the electrical appliance DB 111 matches one of the notification conditions, the transmission unit 23 transmits a message (state notification) to information terminals 150 via the communication network and stores the terminal ID of the information terminals 150 to which the state notification has been transmitted, and a notification time that is a transmission time of the state notification in the notification history DB 113.

Examples of a content of the message include "The laundry is done," "If you lower the set temperature of the air conditioner 140b in the living room by 1° C. for energy saving, 10% of electricity is saved," "The recorder 140c has little hard disk space. Delete an unnecessary program or move a program to another medium," and "Something is wrong with the compressor of the refrigerator. Contact the repair center."

The information terminals 150 each transmit an acknowledgement notification indicating that the user has acknowledged the received state notification, to the information notification apparatus 100. Upon receiving acknowledgement notifications transmitted from the information terminals 150, the second reception unit 122 stores information included in the received acknowledgement notifications in the information terminal DB 112.

The acknowledgement notification includes, for example, the terminal ID that is information for identifying the information terminal 150 and a notification acknowledgement time indicating a time when the user has acknowledged the state notification. Alternatively, instead of including the notification acknowledgement time in the acknowledgement notification, a transmission time indicating a time when the acknowledgement notification has been transmitted from the information terminal 150 or a reception time indicating a time when the information notification apparatus 100 has received the acknowledgement notification may be used, instead of the notification acknowledgement time.

As illustrated in FIG. 1, while the information terminals 150 for displaying messages are used as a generic term for a father's smartphone 150a, a mother's smartphone 150b, a child's mobile phone 150c, and a television 150d in the living room, examples of the information terminals may also include other devices such as displays dedicated for display of information and notebook type personal computers, in addition to mobile phones and smartphones held by individual users and televisions. It is assumed that there is typically a plurality of information terminals 150 in each household.

Note that this embodiment describes an example of the information terminals 150 that notify users of the content of state notifications by displaying the content of the state notifications on their display screens, the present invention is not limited to this example, and users may be notified of the content of state notifications, using other means such as sound, light, or vibrations.

In each household, some of the electrical appliances 140 are commonly used by all family members, and some are mainly used by a specific user. Although the utilization of each appliance varies from household to household, it is desirable that information about an electrical appliance 140 that is mainly used by a certain user be transmitted to an information terminal 150 that is mainly used by that user. It is also desirable that information about an electrical appliance 140 that is used by all family members be transmitted to an information terminal 150 that is held by a user who will most appropriately handle that message.

Figure 2:
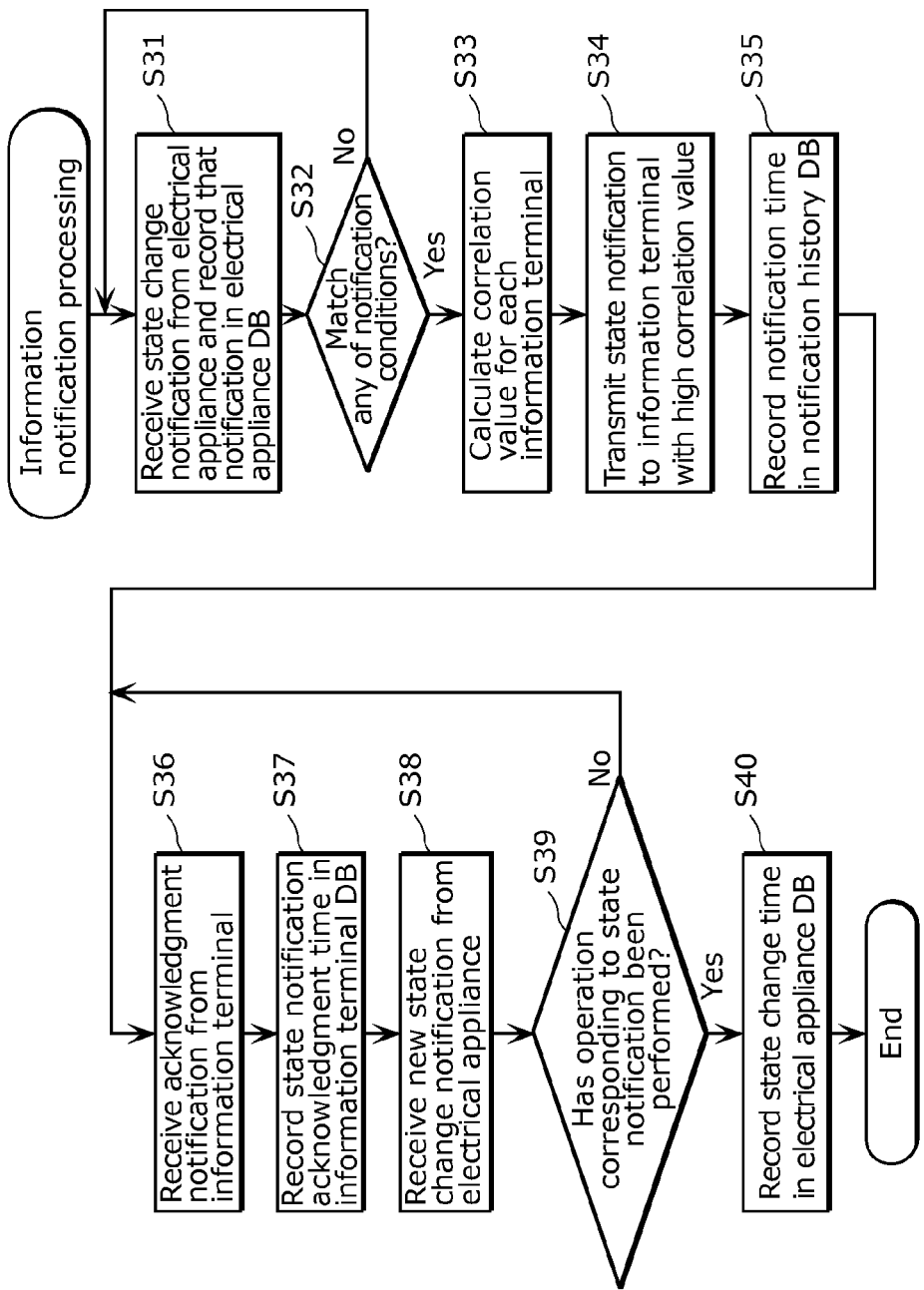
FIG. 2 is a flowchart showing a procedure of information notification processing according to Embodiment 1.
Figure 3:
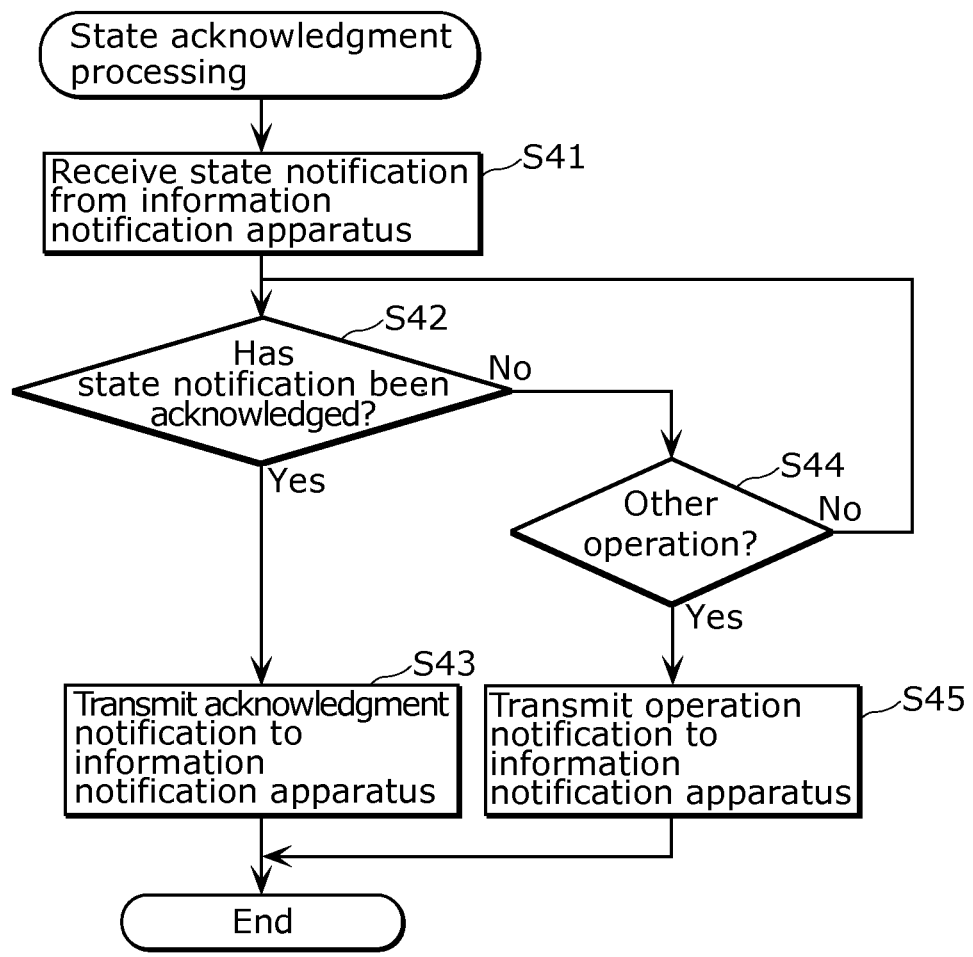
FIG. 3 is a flowchart showing a procedure of state acknowledgement processing according to Embodiment 1.

Hereinafter, a procedure of processing performed by the information notification apparatus will be described with reference to the flowcharts of FIGS. 2 and 3. FIG. 2 is a flowchart showing a procedure of information notification processing performed by the information notification apparatus 100, and FIG. 3 is a flowchart showing a procedure of state acknowledgement processing performed by an information terminal 150.

First, as shown in FIG. 2, the first reception unit 121 of the information notification apparatus 100 receives a state change notification (first state change notification) from an electrical appliance 140 and stores the received information (typically, the state of the electrical appliance 140 and the state change time) in the electrical appliance DB 111 (step S31). Here, the following processing will be described on the assumption that a notification indicating a state that "the laundry is done" (first state) has been given from the washing machine 140a.

Next, the information notification apparatus 100 determines whether or not the state of the electrical appliance 140 that has been newly stored in the electrical appliance DB 111 matches one of the notification conditions that require a user to make some determination or to take some action (step S32). It is however noted that step S32 is not an absolute necessity and may be omitted. In other words, the information notification apparatus 100 may notify the information terminals 150 of all information received from the electrical appliances 140.

Here, if it has been determined that the state matches one of the notification conditions (Yes in step S32), the transmission unit 23 calculates correlation values for the information terminals 150 with respect to the electrical appliance 140 of interest, based on the information stored in the electrical appliance DB 111, the information terminal DB 112, and the notification history DB 113 (step S33). A specific method for calculating a correlation value will be described later.

On the other hand, if it has been determined in step 32 that the state of the electrical appliance 140 does not match one of the notification conditions (No in step S32), the first reception unit 121 continues to collect state change notifications from the electrical appliances 140.

Next, the transmission unit 23 transmits a state notification that includes information about the state of the electrical appliance 140 to an information terminal 150 that has a high correlation value calculated in step S33 (step S34). Specifically, this state notification includes information indicating that the washing machine 140a is in the "laundry-is-done" state. The transmission unit 23 then stores the destination of transmission of the state notification and a transmission time (notification time) in the notification history DB 113 (step S35).

As a result, as shown in FIG. 3, the information terminal 150 receive the state notification transmitted from the information notification apparatus 100 (step S41). This state notification may be transmitted in the form of an e-mail or may be given to a dedicated application installed in the information terminal 150.

If a user has noticed and acknowledged this state notification (message) (Yes in step S42), the information terminal 150 transmits an acknowledgement notification to the information notification apparatus 100, the acknowledgement notification including the terminal ID for identifying the information terminal, a state notification acknowledgement time indicating a time when the state notification has been acknowledged, and information indicating that the user has acknowledged the message (step S43).

On the other hand, if the message has not been acknowledged (No in step S42), the information terminal 150 checks whether or not it is being used for another operation other than the operation of acknowledging the message (step S44). The other operation as used here involves all kinds of operations such as an operation of a user not checking a content of the message although having noticed the presence of the message (e.g., deleting a message) and an operation of a user using other functions of the information terminal 150 (e.g., reading or writing an e-mail or browsing a Web site).

In the case of terminal handling as described above (Yes in step S44), the information terminal 150 transmits an operation notification to the information notification apparatus 100, the operation notification including the terminal ID, a terminal operation time indicating a time when the operation has been performed, and information indicating the fact of handling of the information terminal 150 (step S45), and the processing ends. It is conceivable that this situation can occur when the user has noticed the receipt of the message but has not yet intentionally acknowledged the content of the message.

If the case of no other terminal handling (No in step S44), the information terminal 150 continues to wait for the user to acknowledge the state notification. It is conceivable that this situation can occur when the user is not handling the information terminal 150 and thus has not yet noticed the presence of the state notification.

After the processing of the information terminals 150, as shown in FIG. 2, the second reception unit 122 of the information notification apparatus 100 receives acknowledgement notifications or operation notifications from the information terminals 150 to which the state notification has been transmitted (step S36) and stores the content of the received notifications in the information terminal DB 112 (step S37). Specifically, the second reception unit 122 stores the terminals ID of the information terminals 150 that have transmitted the notifications and state notification acknowledgement times (in the case of acknowledgement notifications) or terminal operation times (in the case of operation notifications) in the information terminal DB 112.

Then, the first reception unit 121 again receives a state change notification (second state change notification) from the electrical appliance 140 (step S38). The state change notification received here is given as a result of the state of the electrical appliance 140 having changed in relation to the state notification transmitted in step S34. That is, it is checked whether or not a user who acknowledged the state notification has performed some operation on the electrical appliance 140 (step S39).

For example, when a state notification including a message reading that "the laundry is done" has been transmitted from the transmission unit 23 to the information terminals 150, a situation is conceivable in which, after the transmission of the notification, the door of the washing machine 140a is opened and the laundry is taken out of the machine. In this case, the first reception unit 121 checks whether or not a notification indicating a state (second state) that the door of the washing tub is open is given from the washing machine 140a after the transmission of the state notification. As another example, when a state notification including a message reading that "If you lower the set temperature of the air conditioner 140b in the living room by 1° C. for energy saving, 10% of electricity is saved" has been transmitted, the first reception unit 121 checks whether or not the set temperature of the air conditioner 140b in the living room has been actually changed and then a state change notification including a state after the change has been received.

Here, if the state of the electrical appliance 140 has changed (Yes in step S39), the first reception unit 121 stores the state change time included in the received state change notification in the electrical appliance DB 111 (step S40), and the processing ends. On the other hand, if the state of the electrical appliance 140 has not changed (No in step S39), the first and second reception units 121 and 122 continue to wait for notifications from the information terminals 150 and the electrical appliance 140.

Here, steps S36 to S38 are not always executed in the order specified

For example, when the state notification has been transmitted to a plurality of information terminals 150 in step S34, the second reception unit 122 receives acknowledgement notifications or operation notifications from all or some of the information terminals 150 to which the state notification has been transmitted, in step S36. Meanwhile, when the state notification has been transmitted to only one information terminal 150 that has the highest correlation value in step S34, if no acknowledgement notification has been received within a predetermined period of time in step S36, the processing returns to step S34 and the state notification is transmitted to an information terminal 150 that has the second highest correlation value. Then, this processing is repeatedly performed while switching the information terminal 150 in descending order of the correlation value until an acknowledgement notification is obtained.

Aside from this, the first reception unit 121 receives various state change notifications from the electrical appliances 140 in step S38. If, among the state change notifications received by the first reception unit 121 in step S38, there is a state acknowledgement notification that results from an operation performed on the electrical appliance 140 of interest by a user who has noticed the acknowledgement notification transmitted in step S34 (Yes in step S39), the state change time included in this state acknowledgement notification is stored in the electrical appliance DB 111 (step S40).

Through the above-described processing procedure, the information notification apparatus 100 is able to, for each of the information terminals 150, collect notification times when operation information about the electrical appliances 140 has been transmitted, state acknowledgement times (terminal operation times) at the information terminal 150, and state change times of the electrical appliances 140. The, the information notification apparatus 100 calculate correlation values in step S33 by comparing the above three pieces of information that have been collected previously.

Next, the details of the information stored in the storage unit 110 and the details of the correlation value calculation method used in the transmission unit 23 will be described with reference to FIGS. 4 to 6B FIGS. 4 and 5 show examples of the state histories of the information terminals 150. For example, FIG. 4 illustrates the state history of the father's smartphone 150a in a certain household as of 21:00 on Mar. 3, 2011, and FIG. 5 illustrates the state history of the mother's smartphone 150b in the same household as of 21:00 on Mar. 3, 2011. FIGS. 4 and 5 also illustrate, for the information terminals 150, times when state notifications about the washing machine 140a, the air conditioner 140b in the living room, and the recorder 140c have been transmitted (notification times), whether or not these notifications have been acknowledged, times when these notifications have been acknowledged (state notification acknowledgement times) or times when the terminal has been operated (terminal operation times), and times when the states of the electrical appliances 140 have been changed in response to the state notifications (state change times) in association with one another.

Although these pieces of information are illustrated in the form of a table in FIGS. 4 and 5, in actuality, "notification times" are stored in the notification history DB 113, "acknowledgement notifications," "state notification acknowledgement times," and "terminal operation times" are stored in the information terminal DB 112, and "state change times" are stored in the electrical appliance DB 111, in association with one another. Also, "correlation values" are values calculated by the transmission unit 23.

Here, "YES" in the field of "acknowledgement notification" indicates that the second reception unit 122 has received an acknowledgement notification for that state notification, and the acknowledgement time is shown in the corresponding field of "state notification acknowledgement time." Meanwhile, "No" in the field of "acknowledgement notification" indicates that the second reception unit 122 has not received an acknowledgement notification for the state notification, and if a time is shown in the corresponding field of "terminal operation time", it means that an operation notification has been received.

As an example, the second row in the table of FIG. 4 indicates that a state notification about the washing machine 140a has been transmitted to the father's smartphone 150a at 9:14 on Mar. 1, 2011. A content of the notification is, for example, that "the laundry is done." The table shows that this state notification has been acknowledged by the father's smartphone 150a at 12:16 on the same date. The table also shows that the state of the washing machine 140a has changed at 9:17 on the same date.

That is, the state of the washing machine 140a changed before the state notification was acknowledged by the father's smartphone 150a. Thus, it is hardly considered that the state notification given to the father's smartphone 150a caused the action taken on the washing machine 140a. Although similar state notifications about the washing machine 140a were transmitted almost once every day, the state change times were in either case earlier than the state notification acknowledgement times. From this, it can be thought that there is little correlation among the father's smartphone 150a, the state notifications indicating that "the laundry is done," and the action of taking the laundry out of the washing machine 140a (a state change that the door of the washing tub is opened). Such a tendency appears, for example, when not the father who is the owner of the father's smartphone 150a, but another user is doing the laundry.

The second row in the table illustrated in FIG. 5 indicates that the same state notification about the washing machine 140a has also been transmitted to the mother's smartphone 150b at 9:14 on Mar. 1, 2011. The content of the notification is the same as in the example of FIG. 4, i.e., "the laundry is done." This state notification has been acknowledged with the mother's smartphone 150b at 9:15 on the same date. Then, the state of the washing machine 140a changed at 9:17 on the same date. Thus, it can be considered that it is highly likely that the laundry was taken out of the washing machine 140a (the door of the washing tub was opened) after the state notification was checked with the mother's smartphone 150b.

Similarly, data on May 3, 2011 (third row in the table) indicates that the notification time of the state notification, the notification acknowledgement time, and the state change time of the washing machine 140a are sequential and close to each other. From this, it can be considered that it is highly likely that the laundry was taken out of the washing machine 140a after the state notification was acknowledged with the mother's smartphone 150b. In other words, such a tendency appears when the mother who is the owner of the mother's smartphone 150b is doing the laundry.

However, data on May 3, 2011 (fourth row in the table) indicates that a state notification was transmitted at 9:16, but had not yet been acknowledged with the mother's smartphone 150b as of 21:00 on the same date. Meanwhile, some action was taken on the washing machine 140a at 9:16 on the same date. In this case, there is little correlation between the state notification and the action of taking the laundry out of the washing machine 140a. Such a situation can occur, for example, when the mother happened to be around the washing machine 140a at the time when the laundry was done, noticing the completion of the laundry without acknowledging the message with her information terminal 150, and took the laundry out of the washing machine. The same situation can also occur when the mother acknowledged the state notification with another information terminal (e.g., the television 150d in the living room) other than her smartphone, and took the laundry out of the machine.

In this way, even if the electrical appliances 140 are not controlled using the information terminals 150, it is possible to grasp which user often uses a certain electrical appliance 140, i.e., which user requires information about that electrical appliance 140, based on the correlation among the notification time when the operation information about the electrical appliance 140 has been transmitted as a state notification, the state notification acknowledgement times at the information terminals 150, and the state change time of the electrical appliance 140.

Then, the transmission unit 23 calculates, for each of the information terminals 150 to which the state notification indicating that "the laundry is done" has been transmitted, the degree of likelihood that the owner of the information terminal 150 performed the operation of "opening the door of the washing tub of the washing machine 140a" as a correlation value. More specifically, the transmission unit 23 calculates a higher correlation value if the state notification acknowledgement time is earlier than the corresponding state change time and as the difference between the state notification acknowledgement time and the state change time is smaller.

In this way, the transmission unit 23 obtains an information terminal 150 that tends to have a high correlation with each electrical appliance 140 in a household by evaluating the correlation between the information terminal 150 and the electrical appliance 140 and continuously storing and averaging the evaluation results. For example, in FIGS. 4 and 5, a correlation value of "2" is assigned in the case of a high correlation, a correlation value of "1" is assigned in the case of a low correlation, and a correlation value of "0" is assigned in the case of no correlation. Furthermore, a correlation value of "−2" is assigned in the case where no action has been taken on the state notification.

Note that the above "case of a high correlation" refers to, for example, a case where the state notification acknowledgement time is earlier than the corresponding state change time and the difference between the state notification acknowledgement time and the state change time is less than or equal to a threshold value. The "case of a low correlation" refers to, for example, a case where the state notification acknowledgement time is earlier than the corresponding state change time and the difference between the state notification acknowledgement time and the state change time is higher than the threshold value. Furthermore, the "case of no correlation" refers to, for example, a case where the state notification acknowledgement time is later than the corresponding state change time, or a case where an operation notification has been received instead of an acknowledgement notification.

FIG. 6A shows an example of correlation values for the information terminals 150 with respect to a state notification about the washing machine 140a used in a certain household, and average correlation values that are average values of correlation values calculated within a predetermined period of time. Similarly, FIG. 6B shows an example of correlation values for the information terminals 150 with respect to a state notification about the air conditioner 140b in the living room, and average correlation values that are average values of correlation values calculated within a predetermined period of time.

For example, it can be said that for the message about the washing machine 140a reading that the laundry is done, the mother's smartphone 150b has the highest correlation values on average. On the other hand, the father's smartphone 150a and the child's mobile phone 150c have low correlation values. Note that it is conceivable that the reason why the television 150d in the living room has a correlation value of "2" on only Mar. 3, 2011 is because, on this day, the mother noticed the state notification displayed on the television 150d in the living room, the notification indicating that the laundry was done, instead of that displayed on her smartphone, and then took the laundry out of the washing machine.

At first, the information notification apparatus 100 transmits a state notification to all registered information terminals 150 and thereby collect information about the information terminals 150 and calculate correlation values for these terminals. However, if the above-described tendency continues, the transmission unit 23 may from this time on transmit the state notification about the washing machine 140a that the laundry is done to only the mother's smartphone 150b that has the highest average correlation value, and if no action is taken even if the state notification has been transmitted to the mother's smartphone 150b, the transmission unit may be switched to the action of transmitting the state notification to the television 150d in the living room that has the second highest average correlation value.

Alternatively, the transmission unit 23 may transmit the state notification about the washing machine 140a that the laundry is done to all information terminals 150 having average correlation values higher than a threshold value. In the example of FIG. 6A, if the threshold value is set to 0.2, the transmission unit 23 will transmit the state notification to the mother's smartphone 150b and the television 150d in the living room.

In this way, by narrowing the information terminals 150 to which the state notification is to be transmitted, based on the correlation values, the state notification is no longer transmitted to the father and the child who do not usually do the laundry. As a result, it is possible for the father and the child to save the trouble of acknowledging unnecessary messages one by one.

As a result, even if the range of notification is not set in advance by a user depending on the content of notification, it is possible to transmit information to only a user who is estimated to need that information at the current point in time. By further continuously calculating correlation values, even if the lifestyle of a user has changed, it is possible to transmit information within an optimal range of notification at that time, with more importance attached to more recent correlation values. That is, average correlation values may be calculated by, instead of simply averaging the correlation values in FIGS. 6A and 6B, performing weighted addition in which lower weight is assigned to older correlation values and higher weight is assigned to more recent correlation values.

Next, referring to FIG. 6B, for a notification about the air conditioner 140b in the living room that "If you lower the set temperature of the air conditioner 140b in the living room by 1° C. for energy saving, 10% of electricity is saved," the message was acknowledged with all of the information terminals 150, but none of the users changed the set temperature. Thus, the correlation values are all set to "−2." Accordingly, it is regarded that in this household, the message about the set temperature of the air conditioner 140b in the living room is inoperative, and therefore similar notifications will not be given from this time on.

With the above-described configuration, notifications to the information terminals 150 can be given under appropriate conditions by dynamically changing the range of notification to the information terminals 150 held by users and the priority of display, based on the correlation among the notification histories regarding the operating states of the electrical appliances 140, the state histories of the information terminals 150, and the operating state histories of the electrical appliances 140. This brings about the effect of preventing users from missing more important information and the effect of enabling users to easily find information needed by the users.

Although in this embodiment, the correlation values are expressed as discrete values and the average values of the correlation values are calculated, another calculation method may be performed, such as a calculation method of recording a difference in time between the message acknowledgement time and the state change time of an electrical appliance 140 and setting a higher correlation value for an information terminal 150 with a smaller difference in time, or a calculation method of setting a higher correlation value for an information terminal 150 with a higher number of times that the notification acknowledgement time and the state change time of the electrical appliance 140 are included within a predetermined period of time.

Although this embodiment describes an example in which a correlation value is calculated based on the correlation between the state notification acknowledgement time and the state change time, the method for calculating a correlation value is not limited to this. For example, the information notification apparatus 100 may obtain a correlation value based on the order of receipt of the acknowledgement notification from each information terminal 150 and the state change notification from each electrical appliance 140. Specifically, the highest correlation value may be set to an information terminal from which an acknowledgement notification received immediately before the state change notification has been transmitted. In this case, it is sufficient to store the facts of receipt of the acknowledgement notification and the state change notification in the order of receipt in the storage unit 110.

Embodiment 2

Next is a description of an information notification apparatus 100 according to Embodiment 2 of the present invention. Note that a detailed description of points in common with Embodiment 1 will be omitted, and the following description focuses on differences from Embodiment 1.

Figure 7:
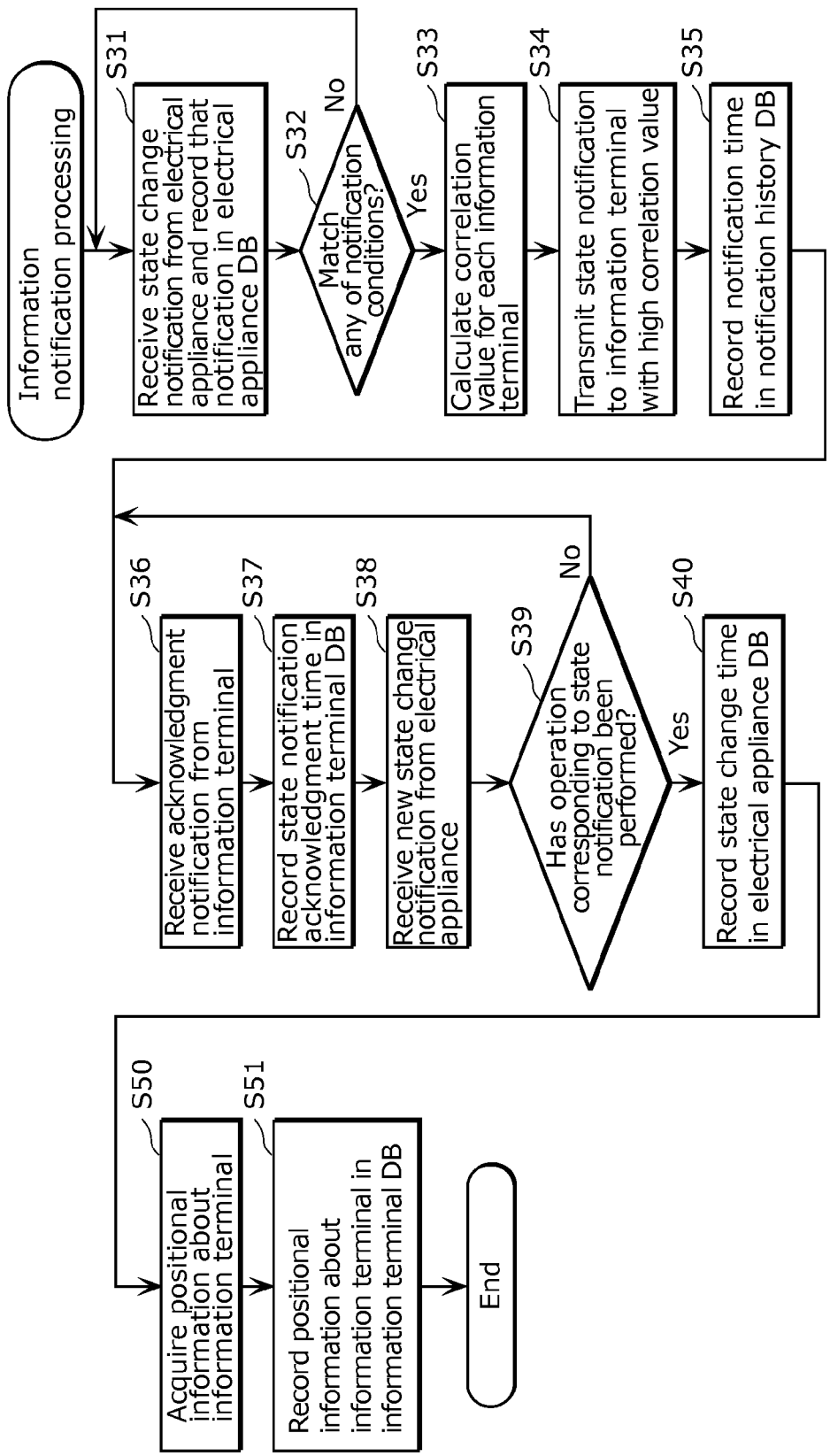
FIG. 7 is a flowchart showing a procedure of information notification processing according to Embodiment 2.
Figure 8:
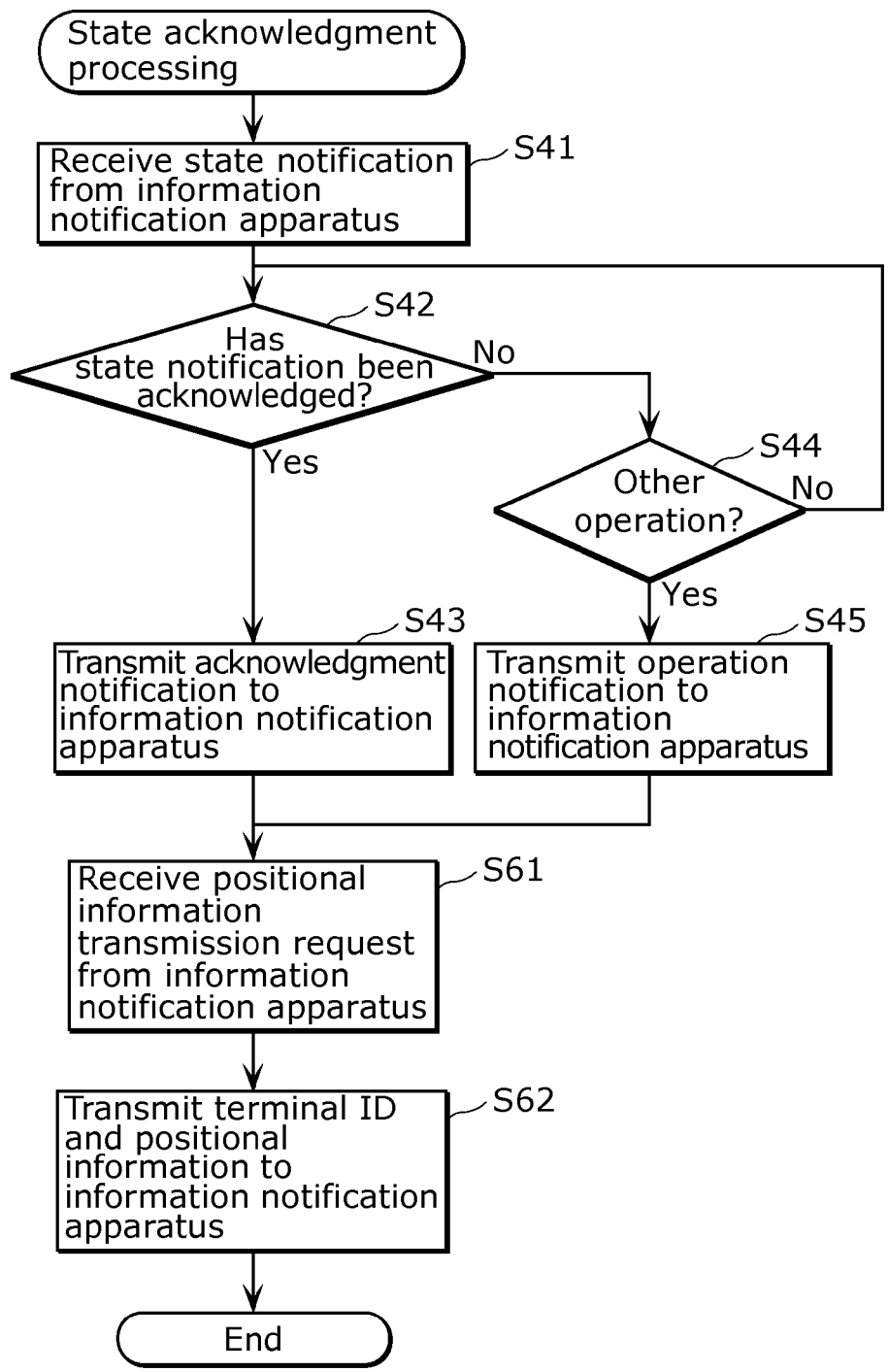
FIG. 8 is a flowchart showing a procedure of state acknowledgement processing according to Embodiment 1.

FIG. 7 is a flowchart showing a procedure of information notification processing performed by the information notification apparatus 100 according to Embodiment 2 of the present invention, and FIG. 8 is a flowchart showing a procedure of state acknowledgement processing performed by an information terminal 150 according to Embodiment 2 of the present invention. In FIGS. 7 and 8, constituent elements that are the same as those in FIGS. 2 and 3 are given the same reference numerals, and a description thereof will be omitted.

In FIG. 7, when it has been determined that the state of an electrical appliance 140 matches one of conditions that require a user to make some determination or to take some action (Yes in step S32), the information notification apparatus 100 according to Embodiment 2 transmits a state notification to an information terminal 150 that has a high correlation value (step S34) and then collects information about the operation of the information terminal 150 and whether or not the operating state of the electrical appliance 140 has changed (steps S36 to S40), as in Embodiment 1.

Thereafter, the information notification apparatus 100 according to Embodiment 2 causes the second reception unit 122 to acquire positional information about the information terminal 150 (step S50) and records the received positional information about the information terminal 150 in the information terminal DB 112 (step S51), and then the processing ends. Specifically, the transmission unit 23 transmits a request to transmit positional information (positional information transmission request) to the information terminals 150 at the time when the first reception unit 121 has received a state change notification indicating that the state of the electrical appliance 140 has changed to the second state. The positional information transmission request may include a state change time when the electrical appliance 140 has changed to the second state. Then, the second reception unit 122 receives a response (including the terminal ID and the positional information) to the positional information transmission request from each of the information terminals 150 and stores that response in the information terminal DB 112.

Meanwhile, as shown in FIG. 8, upon receipt of the positional information transmission request from the information notification apparatus 100 (step S61) after the processing shown in FIG. 3 (steps S41 to S45), an information terminal 150 transmits its terminal ID and positional information at that time (indicating a "time when the state of the electrical appliance 140 has changed to the second state) to the information notification apparatus 100 (step S62), and the processing ends. Note that positional information at a transmission time of the positional information transmission request or a reception time of the positional information transmission request may be transmitted instead of the positional information at the state change time.

In this way, by acquiring position information about each of the information terminals 150 at the time when the operating state of the electrical appliance 140 has changed to the second state, it is possible to grasp whether or not the owner of the information terminal 150 was around the electrical appliance 140 at the time when the electrical appliance 140 has been operated.

FIG. 9 shows an example of the state history of an information terminal 150. Note that "notification time," "acknowledgement notification," "state notification acknowledgement time," "state change time," and "correlation value" are the same as those of Embodiment 1 shown in FIG. 4. Here, "terminal operation time" has not been shown.

The second to fourth rows in the table of FIG. 9 indicate positional information about the father's smartphone 150a at the times when the laundry was taken out of the washing machine 140a (the door of the washing tub was opened). The table shows that in either case, the father's smartphone 150a is located "outside home." Because it is unlikely for the father outside home to take the laundry out of the washing machine, it is regarded that there is little correlation between the transmission of messages to the father's smartphone 150a and the actions taken on the washing machine 140a. Thus, in the present example, a correlation value of "−3" that indicates a much lower correlation has been set for the father's smartphone 150a.

The ninth row indicates that for a state notification about the recorder 140c that "the recorder has little hard disk space. Delete an unnecessary program or move a program to another medium," positional information about the father's smartphone 150a at the time when a program in the hard disk has been deleted indicates "at home". Accordingly, it is regarded that there is a high correlation between the transmission of messages to the father's smartphone 150a and the actions taken on the recorder 140c. In the present example, a correlation value of "3" that indicates a much higher correlation has been set for the father's smartphone 150a.

Similarly, for the other information terminals 150, positional information at the time when the state of an electrical appliance 140 has changed is used to calculate a correlation value. This can emphasize weighing of the correlation.

Note that as a method for grasping the positional information about an information terminal 150, the positional information may be determined based on GPS information or information about the used communication network. The positional information about home may be registered in advance by a user in the information notification apparatus 100, or it is also possible to automatically determine and define a point in place where the information terminal 150 is situated for the longest period of time, as home. Alternatively, in the case where the information terminals 150 and the electrical appliances 140 have a function of short-range communication within a range of several meters, such as infrared communication or specific low-power wireless communication, the position of the information terminal 150 at which that communication function is used to exchange information may be defined as home. As another alternative, if it is possible to grasp a detailed place at home using communication network information or through short-range communication, weighing using a higher correlation is possible based on the state change times of the electrical appliances 140 and the positional information about the information terminals 150.

Furthermore, if only one mobile information terminal 150 (mobile phone or smartphone) is at home at the state change time of an electrical appliance 140, it is likely that the owner of that information terminal 150 has operated the electrical appliance 140. Thus, the weight of that information terminal 150 may be increased.

While in the example of FIG. 9, the positional information is divided into two categories for use, namely at home and outside home, more detailed information may be used instead.

FIG. 10 shows an example of correlation values for the information terminals 150 with respect to a state notification about the washing machine 140a, and average correlation values that are average values of the correlation values calculated within a predetermined period of time, according to Embodiment 2. Although FIG. 10 shows only an example for the washing machine 140a, the same applies to the other electrical appliances 140.

In FIG. 10, an average correlation value of −3 that is lower than that in FIG. 6 is recorded for the father's smartphone 150a, because, as illustrated in FIG. 9, the father was always outside home at the times when the action of taking the laundry out of the washing machine was performed. On the other hand, an average correlation value of "2.25" that is higher than that of Embodiment 1 in FIG. 6 is recorded for the mother's smartphone 150b, because the mother was always at home at the times when the action of taking the laundry out of the washing machine was performed. In this way, by calculating correlation values in consideration of the positional information about the information terminals 150 at the state change time of an electrical appliance 140, a more significant difference in correlation appears among the information terminals 150.

Thus, even if the range of notification is not set by a user and even if the lifestyle of a user has changed, information can be notified of within an optimal range of notification at the time of notification because a difference in the correlation value can appear in a shorter period of time.

Embodiment 3

Next is a description of an information notification apparatus 100 according to Embodiment 3 of the present invention. Note that points in common with Embodiments 1 and 2 will be omitted, and the following description focuses on differences from Embodiments 1 and 2.

Figure 11:
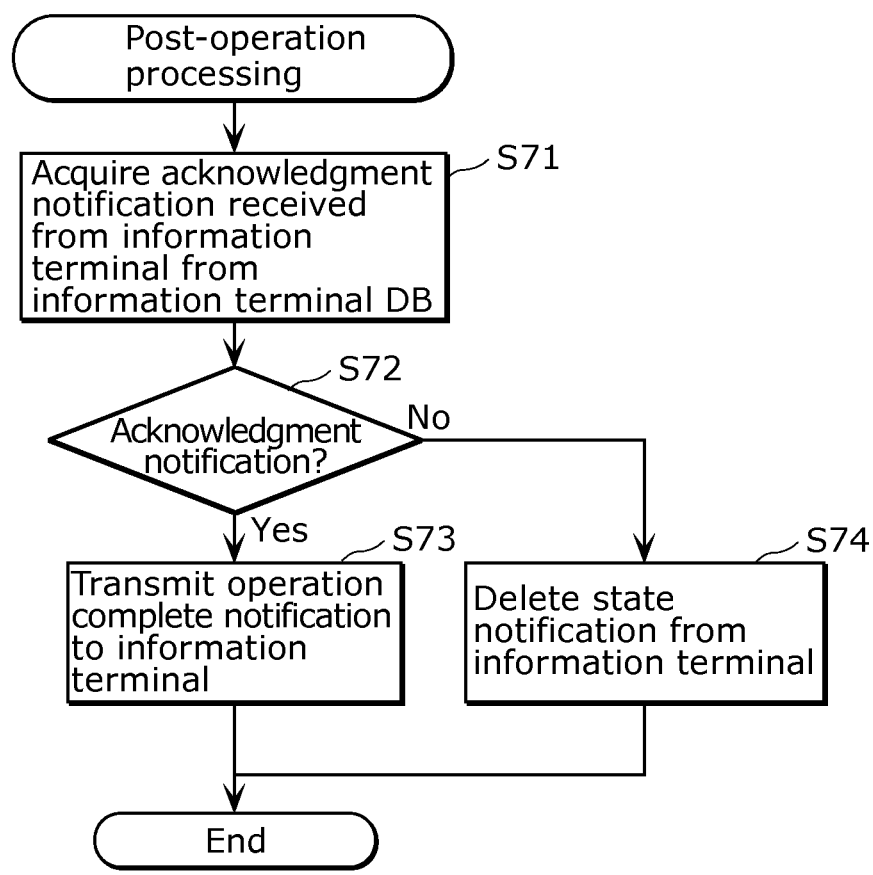
FIG. 11 is a flowchart showing a procedure of post-operation processing according to Embodiment 3.

FIG. 11 is a flowchart showing a procedure of post-operation processing performed by the information notification apparatus 100 according to Embodiment 3 of the present invention. Specifically, FIG. 11 shows a procedure of processing performed after step S40 in the flowcharts of FIGS. 2 and 7, and an illustration and description of the processing up to step S40 have been omitted.

In FIG. 11, the information notification apparatus 100 acknowledges, in the processing up to step S40, that the state of an electrical appliance 140 of interest has changed to the second state, and then again acquires operation information (whether or not the state notification has been acknowledged) about all the information terminals 150 to which the message has been transmitted (step S71).

Then, for an information terminal 150 that has already acknowledged the state notification by that point in time (Yes in step S72), the transmission unit 23 transmits an operation complete notification indicating that an action corresponding to the state notification has already been performed (step S73). On the other hand, for an information terminal 150 that has not yet acknowledged the state notification (No in step S72), the transmission unit 23 transmits an instruction to delete the state notification (step S74), and the processing ends.

As a result, in the case where an electrical appliance 140 is shared by a plurality of users, it is possible for a user to check whether or not the other user has taken action on the state notification. Because only a state notification about an electrical appliance 140 for which no action has not yet been taken is displayed on the information terminals 150, it is possible to further improve the effect of enabling users to easily find necessary information.

Note that if there is a desire to read previous notification information that has been deleted in step S74, a configuration is possible in which even if notification information has been deleted from the information terminals 150, the notification history is left in the notification history DB 113 so that users can read the notification history at their requests.

While in step S73, the operation complete notification is transmitted to only an information terminal 150 that has acknowledged the state notification (Yes in step S72), the present invention is not limited to this, and the operation complete notification may be transmitted to all the information terminals 150 that have received the state notification.

The above-described apparatuses are each superficially a computer system constituted by, for example, a microprocessor, a ROM, a RAM, a hard disk unit, a display unit, a keyboard, and a mouse. A computer program is stored in the RAM or the hard disk unit. By the microprocessor operating in accordance with the computer program, each of the apparatuses achieves its functionality. Here, the computer program is configured by a combination of a plurality of instruction codes that indicate instructions to a computer, in order to achieve predetermined functionality. Note that the apparatuses are not limited to computer systems that each include all constituent elements such as a microprocessor, a ROM, a RAM, a hard disk unit, a display unit, a keyboard, and a mouse, and they may be a computer system constituted by some of these constituent elements.

Some or all of the constituent elements of the above-described apparatuses may be configured as a single system large scale integrated circuit (LSI). The system LSI is a super-multifunctional LSI manufactured by integrating a plurality of constituent elements on a single chip, and is specifically a computer system constituted by, for example, a microprocessor, a ROM, and a RAM. A computer program is stored in the RAM. By the microprocessor operating in accordance with the computer program, the system LSI achieves its functionality. The constituent elements of the above-described apparatuses may be individually embedded in a single chip, or some or all of them may be integrated into a single chip. The system LSI as used here may also be referred to as an IC, an LSI, a super LSI, or an ultra LSI depending on a difference in the level of integration. The technique for achieving an integrated circuit is not limited to LSI technology, and it may be realized by a dedicated circuit or a general-purpose processor. It is also possible to use a field programmable gate array (FPGA) that can be programmed after the manufacture of LSI, or a reconfigurable processor capable of reconfiguring connections and settings of circuit cells in the LSI. If another integrated circuit technology that replaces LSI technology comes along due to advancements in the semiconductor technology or other spin-off technology, naturally such technology may be used for integration of functional blocks. One possible example is the application of biotechnology.

Some or all of the constituent elements of the above-described apparatuses may be configured as an IC card or a single module that is detachable from the apparatuses. The IC card or the module is a computer system constituted by, for example, a microprocessor, a ROM, and a RAM. The IC card or the module may include the above-described supermultifunctional LSI. By the microprocessor operating in accordance with a computer program, the IC card or the module achieves its functionality. This IC card or module may have resistance to tampering.

The present invention may be configured as a method as described above. The present invention may also be configured as a computer program that realizes such a method using a computer, or may be digital signals produced by the computer program. The present invention may also be configured such that the computer program or the digital signals are recorded in a computer-readable recording medium such as a flexible disk, a hard disk, a CD-ROM, an MO, a DVD, a DVD-ROM, a DVD-RAM, a Blu-ray disc (BD), or a semiconductor memory. Alternatively, the present invention may be configured such that the computer program or the digital signals are transmitted via an electrical communication line, a wireless or cable communication line, a communication network typically represented by the Internet, or data broadcasting. The present invention may also be configured as a computer system that includes a microprocessor and a memory, the memory storing the computer program and the microprocessor operating in accordance with the computer program. The present invention may also be implemented as another independent computer system by recording the program or the digital signals in the recording medium and transferring the program or the digital signals, or by transferring the program or the digital signals via the communication network or the like.

Thus, an information notification method according to an aspect of the present invention is a method in which an information notification apparatus including a storage unit notifies at least one of a plurality of information terminals of operation information about an electrical appliance. The information notification method includes receiving a first state change notification from the electrical appliance, the first state change notification indicating that an operating state of the electrical appliance has changed to a first state, in response to the receipt of the first state change notification, transmitting a state notification to at least one of the information terminals, the state notification indicating that the operating state of the electrical appliance is the first state, receiving an acknowledgement notification indicating that the state notification has been acknowledged from the at least one of the information terminals to which the state notification has been transmitted, and storing the received acknowledgement notification into the storage unit, and receiving a second state change notification from the electrical appliance and storing the received second state change notification into the storage unit, the second state change notification indicating that the operating state of the electrical appliance has changed to a second state through an operation performed on the electrical appliance after the transmission of the state notification. In the transmission, a correlation value is calculated for each of the information terminals based on the acknowledgement notification and the second state change notification that are previously stored in the storage unit, and the state notification is transmitted to, among the information terminals, an information terminal that has a calculated correlation value higher than a threshold value, the correlation value indicating a degree of likelihood that an owner of the information terminal has performed an operation corresponding to the second operating state.

A program according to an aspect of the present invention is a program for causing a computer that includes a storage unit to notify at least one of a plurality of information terminals of operation information about an electrical appliance, the program causing the computer to execute: receiving a first state change notification from the electrical appliance, the first state change notification indicating that an operating state of the electrical appliance has changed to a first state, in response to the receipt of the first state change notification, transmitting a state notification to at least one of the information terminals, the state notification indicating that the operating state of the electrical appliance is the first state, receiving an acknowledgement notification indicating that the state notification has been acknowledged from the at least one of the information terminals to which the state notification has been transmitted, and storing the received acknowledgement notification into the storage unit, and receiving a second state change notification from the electrical appliance and storing the received second state change notification into the storage unit, the second state change notification indicating that the operating state of the electrical appliance has changed to a second state through an operation performed on the electrical appliance after the transmission of the state notification. In the transmission, a correlation value is calculated for each of the information terminals based on the acknowledgement notification and the second state change notification that are previously stored in the storage unit, and the state notification is transmitted to, among the information terminals, an information terminal that has a calculated correlation value higher than a threshold value, the correlation value indicating a degree of likelihood that an owner of the information terminal has performed an operation corresponding to the second operating state.

Embodiments and variations described above may be used in combination.

While the above has been a description of embodiments of the present invention with reference to the drawings, the present invention is not intended to be limited to these embodiments. It should be noted that various kinds of modifications, additions, and changes can be made to the above-described embodiments within the same or equivalent scope of the present invention.

The information notification apparatus according to the present invention can be used when notifying a user of information about appliances for mainly use at home, such as a washing machine, an air conditioner, a recorder, a refrigerator, a dish washer, television, a car navigation system, douches and air dryers for attachments to a toilet, a solar cell, a hot-water supply system, and a storage battery. In the case where these electrical appliances are shared by family members, the information notification apparatus is useful as an apparatus for notifying a user who is most effective for notification of information by determining the range of notification from among a plurality of information terminals held by the family members in accordance with utilization of the electrical appliances at home.

REFERENCE SIGNS LIST 10, 100 Information notification apparatus
11 Control unit
12 Wireless communication unit
13 Domestic antenna
14 Wiring unit
15 Storage means
110 Storage unit
111 Electrical appliance DB
112 Information terminal DB
113 Notification history DB
121 First reception unit
122 Second reception unit
123 Transmission unit
140 Electrical appliance
140a Washing machine
140b Air conditioner in the living room
140c Recorder
150 Information terminal
150a Father's smartphone
150b Mother's smartphone
150c Child's mobile phone
150d Television in the living room

The invention claimed is:

1. An information notification apparatus for notifying at least one of a plurality of information terminals of operation information about an electrical appliance, the information notification apparatus comprising:
a storage unit;
a non-transitory memory device that stores a program; and
a hardware processor that executes the program and causes the information notification apparatus to:
receive a first state change notification from the electrical appliance, the first state change notification indicating that an operating state of the electrical appliance has changed to a first state;

in response to having received the first state change notification, transmit a state notification to at least one of the information terminals, the state notification indicating that the operating state of the electrical appliance is the first state; and receive an acknowledgement notification indicating that the state notification has been acknowledged from the at least one of the information terminals to which the state notification has been transmitted, and store the received acknowledgement notification into the storage unit, wherein a second state change notification is received from the electrical appliance and the received second state change notification is stored into the storage unit, the second state change notification indicating that the operating state of the electrical appliance has changed to a second state through an operation performed on the electrical appliance after the transmission of the state notification, and a correlation value is calculated for each of the information terminals based on the acknowledgement notification and the second state change notification that are previously stored in the storage unit, and the state notification is transmitted to an information terminal among the information terminals which has a calculated correlation value higher than a threshold value related to whether an owner has changed the operating state of the electrical appliance to the second state, the correlation value being an indicator of whether an owner of the information terminal has performed an operation to change the operating state of the electrical appliance to the second state.

2. The information notification apparatus according to claim 1, wherein the acknowledgement notification includes a state notification acknowledgement time that indicates a time of acknowledgement of the corresponding state notification, the second state change notification includes a state change time that indicates a time of change in the state of the electrical appliance into the second state, and a higher correlation value is calculated as a difference between the state notification acknowledgement time and the state change time decreases.

3. The information notification apparatus according to claim 2, wherein positional information is received from each of the information terminals, the positional information indicating a position of the information terminal at the state change time, and a higher correlation value is calculated as a distance between the information terminal and the electrical appliance at the state change time decreases.

4. The information notification apparatus according to claim 1, wherein the state notification is transmitted to an information terminal that has a highest correlation value among the information terminals, and when the acknowledgement notification is not received after an elapse of a predetermined period of time since the transmission of the state notification, transmit the state notification is transmitted to an information terminal that has a second highest correlation value among the information terminals.

5. The information notification apparatus according to claim 1, wherein in response to having received the second state change notification, an operation complete notification is transmitted to the at least one of the information terminals to which the state notification has been transmitted, the operation complete notification indicating that an operation corresponding to the state notification has been performed on the electrical appliance.

6. The information notification apparatus according to claim 5, wherein the operation complete notification is transmitted to, among the at least one of the information terminals to which the state notification has been transmitted, only an information terminal from which the acknowledgement notification has been received at a time at which the second state change notification is received.

7. The information notification apparatus according to claim 1, wherein the state notification is deleted from, among the at least one of the information terminals to which the state notification has been transmitted, an information terminal from which the acknowledgement notification has not been received at a time at which the second state change notification is received.

8. An information notification system comprising an electrical appliance, a plurality of information terminals, and an information notification apparatus for notifying at least one of the information terminals of operation information about the electrical appliance, the information notification apparatus including:

a storage unit;

a non-transitory memory device that stores a program; and a hardware processor that executes the program and causes the information notification apparatus to:

receive a first state change notification from the electrical appliance, the first state change notification indicating that an operating state of the electrical appliance has changed to a first state;

in response to having received the first state change notification, transmit a state notification to at least one of the information terminals, the state notification indicating that the operating state of the electrical appliance is the first state; and receive an acknowledgement notification indicating that the state notification has been acknowledged from the at least one of the information terminals to which the state notification has been transmitted, and store the received acknowledgement notification into the storage unit, wherein a second state change notification is received from the electrical appliance and the received second state change notification is stored into the storage unit, the second state change notification indicating that the operating state of the electrical appliance has changed to a second state through an operation performed on the electrical appliance after the transmission of the state notification, and a correlation value is calculated for each of the information terminals based on the acknowledgement notification and the second state change notification that are previously stored in the storage unit, and the state notification is transmitted to an information terminal among the information terminals which has a calculated correlation value higher than a threshold value related to whether an owner of which has changed the operating state of the electrical appliance to the second state, the correlation value being an indicator of whether an owner of the information terminal has performed an operation to change the operating state of the electrical appliance to the second state.

9. An information notification method in which an information notification apparatus including a storage unit notifies at least one of a plurality of information terminals of operation information about an electrical appliance, the information notification method comprising:

receiving a first state change notification from the electrical appliance, the first state change notification indicating that an operating state of the electrical appliance has changed to a first state;

in response to the receipt of the first state change notification, transmitting a state notification to at least one of the information terminals, the state notification indicating that the operating state of the electrical appliance is the first state;

receiving an acknowledgement notification indicating that the state notification has been acknowledged from the at least one of the information terminals to which the state notification has been transmitted, and storing the received acknowledgement notification into the storage unit; and receiving a second state change notification from the electrical appliance and storing the received second state change notification into the storage unit, the second state change notification indicating that the operating state of the electrical appliance has changed to a second state through an operation performed on the electrical appliance after the transmission of the state notification, wherein, in the transmission, a correlation value is calculated for each of the information terminals based on the acknowledgement notification and the second state change notification that are previously stored in the storage unit, and the state notification is transmitted to an information terminal among the information terminals which has a calculated correlation value higher than a threshold value related to whether an owner of which has changed the operating state of the electrical appliance to the second state, the correlation value being an indicator of whether an owner of the information terminal has performed an operation corresponding to the second operating state.

10. A non-transitory computer-readable recording medium for recording a program for causing a computer that includes a storage unit to notify at least one of a plurality of information terminals of operation information about an electrical appliance, the program causing the computer to execute:

receiving a first state change notification from the electrical appliance, the first state change notification indicating that an operating state of the electrical appliance has changed to a first state;

in response to the receipt of the first state change notification, transmitting a state notification to at least one of the information terminals, the state notification indicating that the operating state of the electrical appliance is the first state;

receiving an acknowledgement notification indicating that the state notification has been acknowledged from the at least one of the information terminals to which the state notification has been transmitted, and storing the received acknowledgement notification into the storage unit; and receiving a second state change notification from the electrical appliance and storing the received second state change notification into the storage unit, the second state change notification indicating that the operating state of the electrical appliance has changed to a second state through an operation performed on the electrical appliance after the transmission of the state notification, wherein, in the transmission, a correlation value is calculated for each of the information terminals based on the acknowledgement notification and the second state change notification that are previously stored in the storage unit, and the state notification is transmitted to an information terminal among the information terminals which has a calculated correlation value higher than a threshold value related to whether an owner of which has changed the operating state of the electrical appliance to the second state, the correlation value being an indicator of whether an owner of the information terminal has performed an operation corresponding to the second operating state.

* * * * *